(12) United States Patent
Kim

(10) Patent No.: US 11,287,640 B2
(45) Date of Patent: Mar. 29, 2022

(54) MOBILE ASTRONOMICAL OBSERVATION APPARATUS

(71) Applicant: SL LAB, INC., Seoul (KR)

(72) Inventor: Jeonghyun Kim, Seoul (KR)

(73) Assignee: SL LAB, INC., Seoul (KR)

( * ) Notice: Subject to any disclaimer, the term of this patent is extended or adjusted under 35 U.S.C. 154(b) by 422 days.

(21) Appl. No.: 16/468,671

(22) PCT Filed: Jan. 24, 2018

(86) PCT No.: PCT/KR2018/001083
§ 371 (c)(1),
(2) Date: Jun. 11, 2019

(87) PCT Pub. No.: WO2018/151435
PCT Pub. Date: Aug. 23, 2018

(65) Prior Publication Data
US 2019/0346669 A1    Nov. 14, 2019

(30) Foreign Application Priority Data

Feb. 16, 2017   (KR) .......................... 10-2017-0021275

(51) Int. Cl.
*G02B 23/00*    (2006.01)
*G02B 23/16*    (2006.01)

(52) U.S. Cl.
CPC ........... *G02B 23/16* (2013.01); *G02B 23/165* (2013.01)

(58) Field of Classification Search
CPC ...... G02B 23/00; G02B 23/16; G02B 23/165; G02B 27/64; G02B 27/644
USPC ................................. 359/399–400, 429–430
See application file for complete search history.

(56) References Cited

U.S. PATENT DOCUMENTS

| 6,467,738 | B1 * | 10/2002 | Hedrick | ................ | G02B 23/16 |
| | | | | | 248/164 |
| 7,523,587 | B2 * | 4/2009 | Baird | ...................... | B66F 11/04 |
| | | | | | 182/127 |
| 2010/0219018 | A1 | 9/2010 | Knaak | | |
| 2013/0233996 | A1 * | 9/2013 | Taylor | ................... | F16M 11/18 |
| | | | | | 248/550 |

FOREIGN PATENT DOCUMENTS

| CN | 110244447 | * | 1/2021 |
| JP | 62-284320 A | | 12/1987 |
| JP | 2004-82987 | * | 3/2004 |
| JP | 2016-169830 A | | 9/2016 |
| KR | 20-0207980 Y1 | | 12/2000 |
| KR | 10-2011-0036406 A | | 4/2011 |
| KR | 20180000392 | * | 2/2018 |

OTHER PUBLICATIONS

International Search Report for PCT/KR2018/001083 dated May 11, 2018 from Korean Intellectual Property Office.

* cited by examiner

*Primary Examiner* — Thong Q Nguyen
(74) *Attorney, Agent, or Firm* — Revolution IP, PLLC

(57) ABSTRACT

A mobile astronomical observation apparatus includes transport wheels, a bottom plate, side walls, fixing support parts, an astronomical observation member arranged in a receiving space when the mobile astronomical observation apparatus is in an observation mode, a moving part, a relatively-fixed body movably being coupled to the moving part, a ground-fixing rod being coupled to the relatively-fixed body, and a vibration-resistant member.

6 Claims, 16 Drawing Sheets

[FIG. 1]
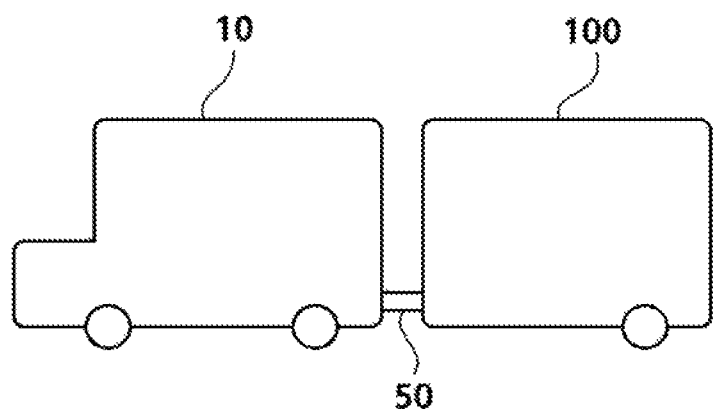

[FIG. 2]
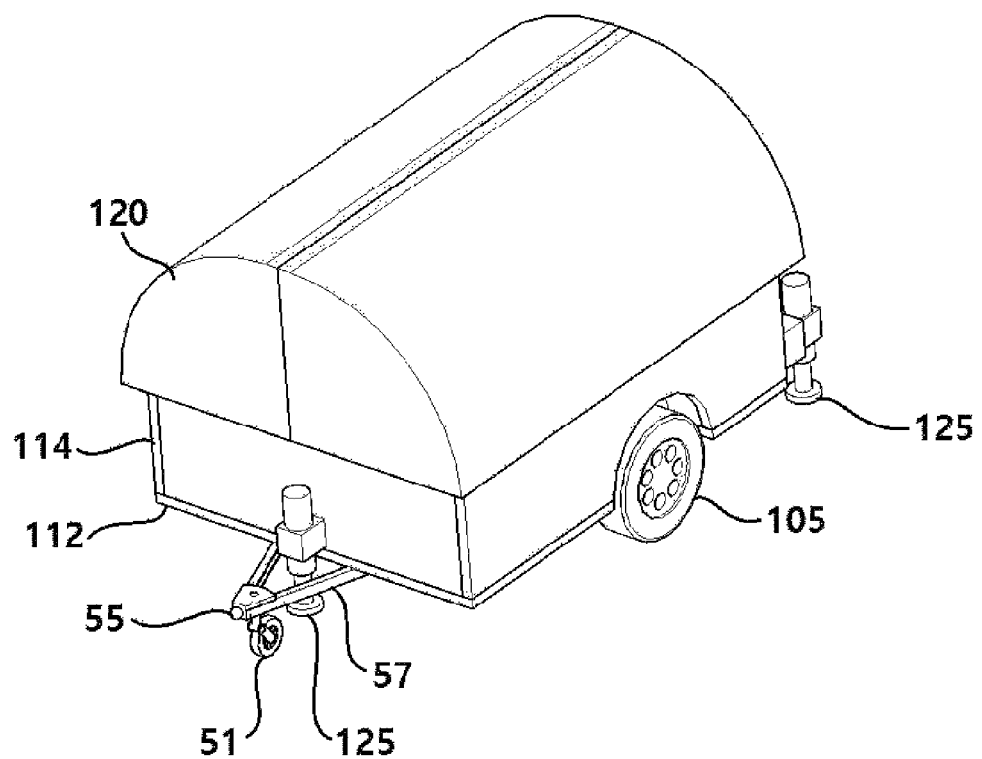

[FIG. 3]
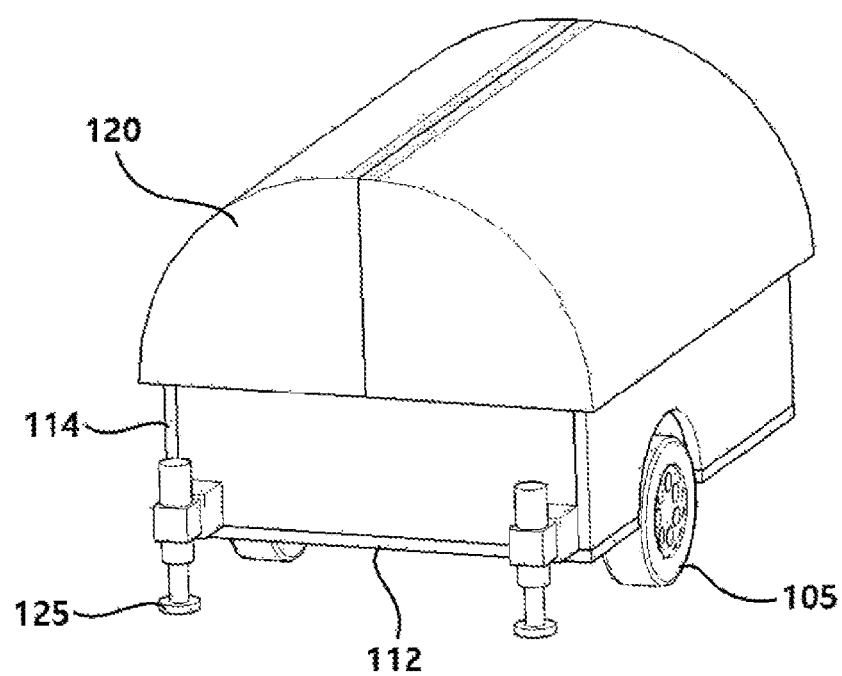

[FIG. 4]
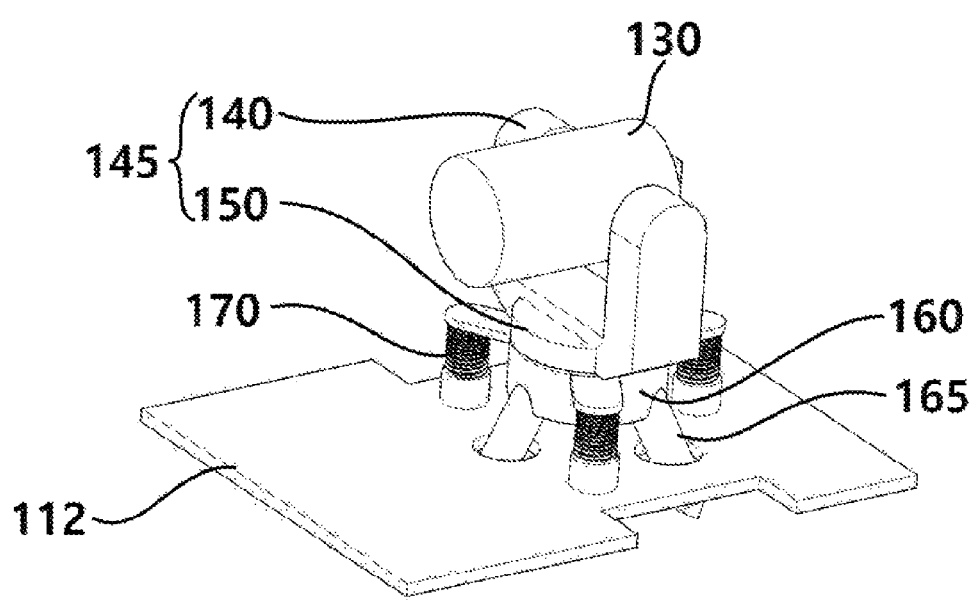

[FIG. 5]
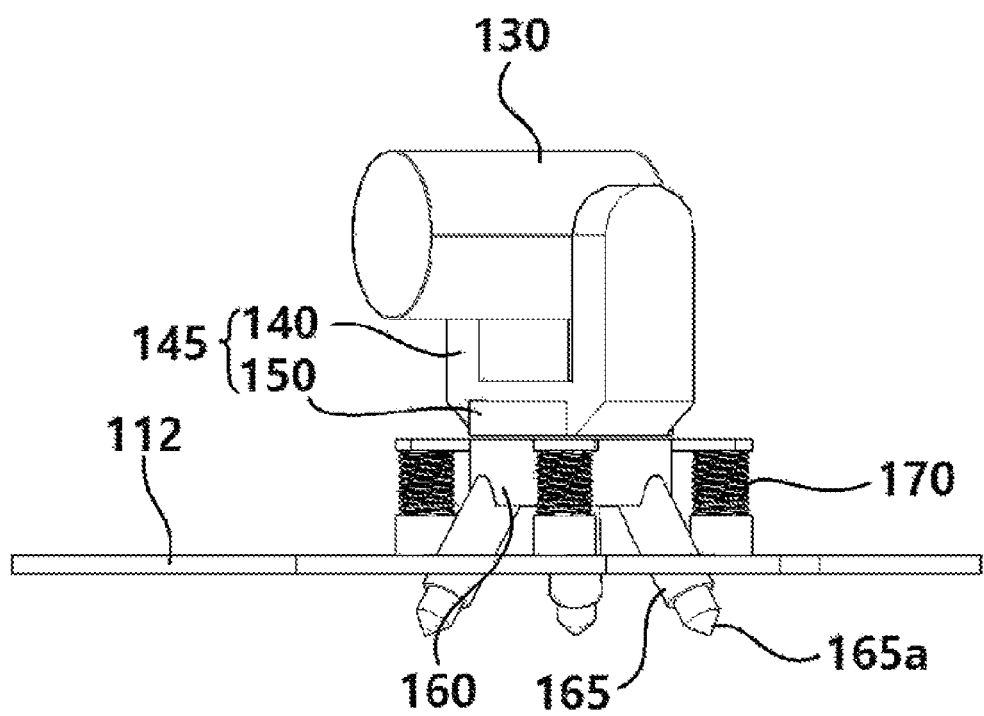

[FIG. 6]
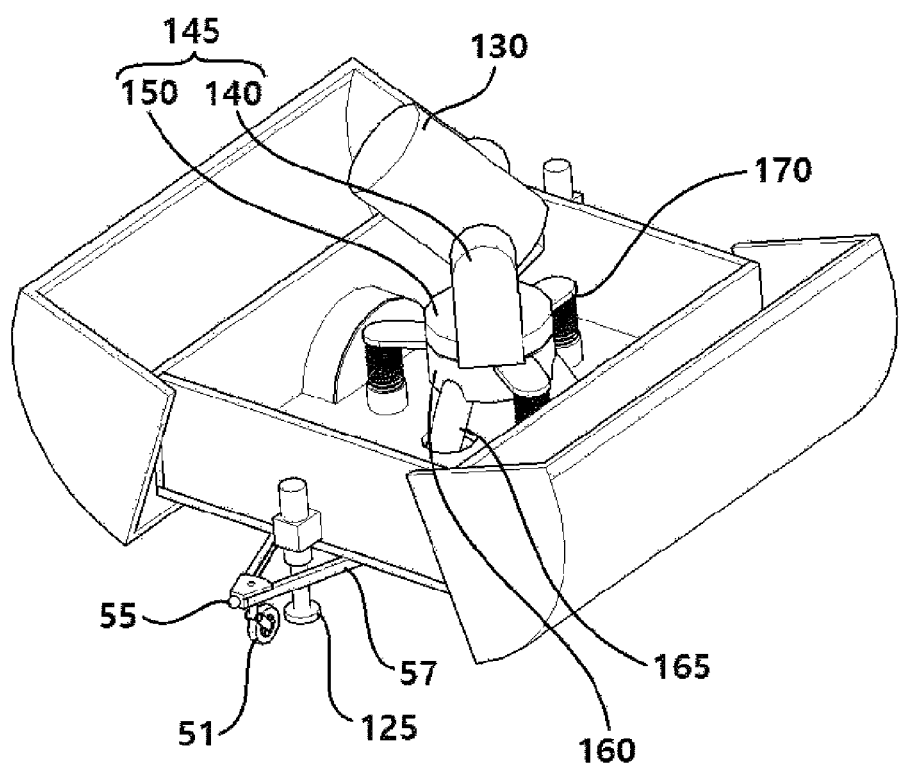

[FIG. 7]
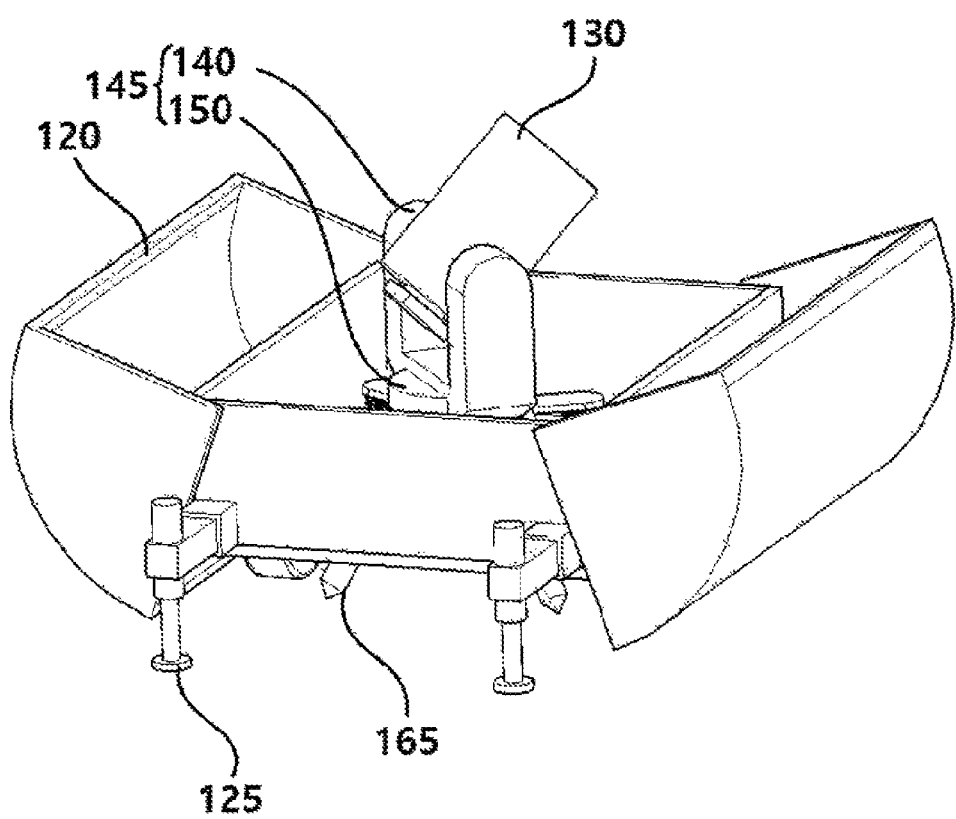

[FIG. 8]
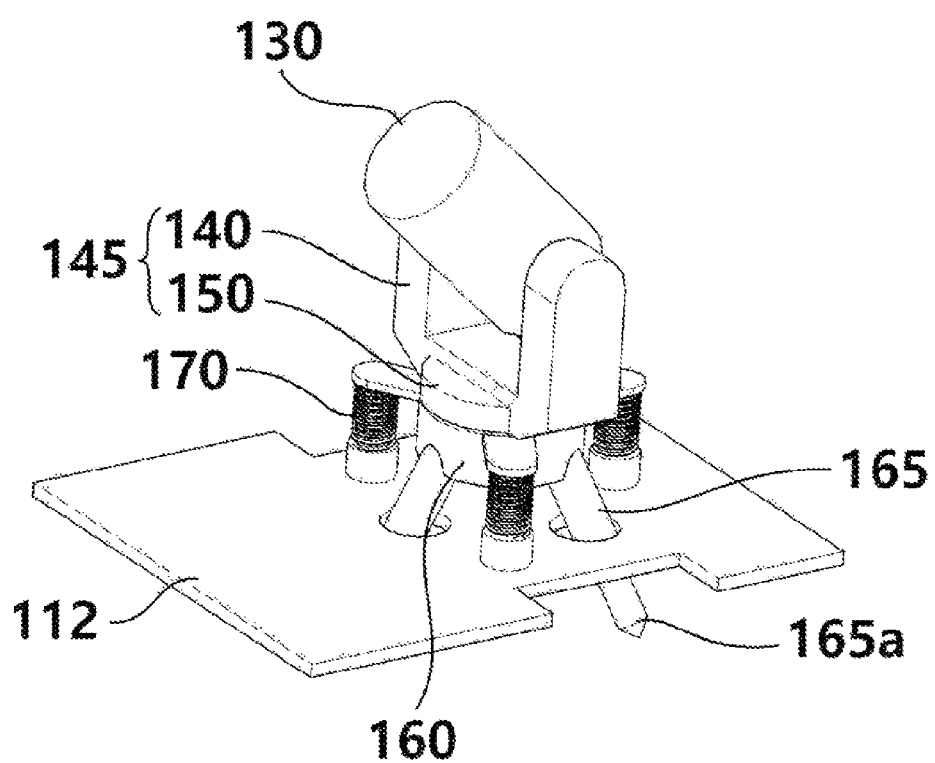

[FIG. 9]
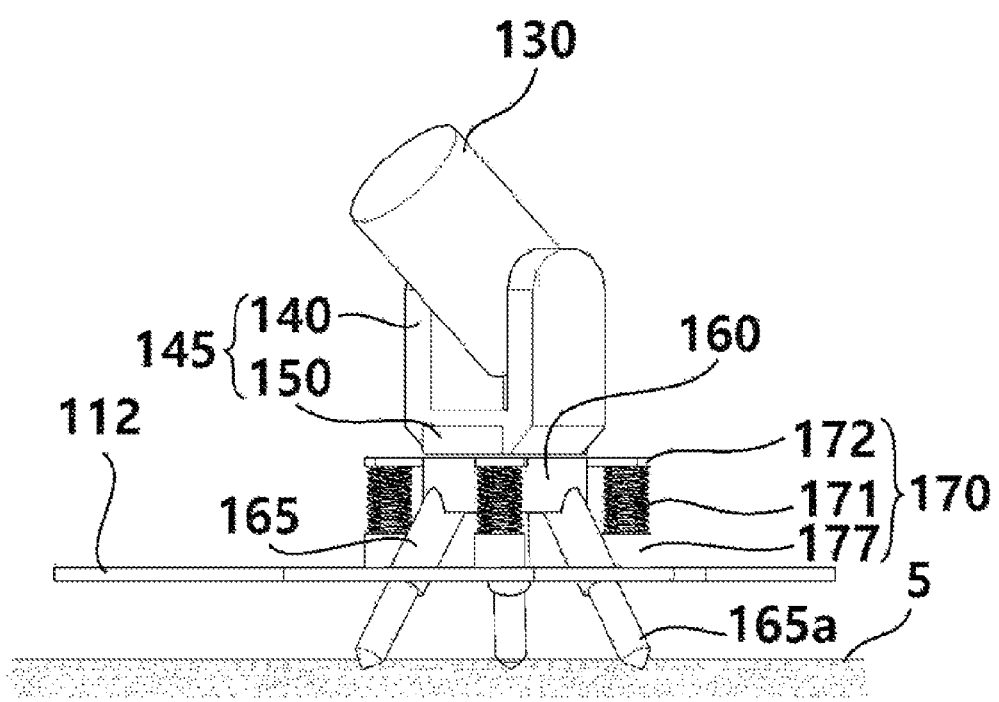

[FIG. 10]
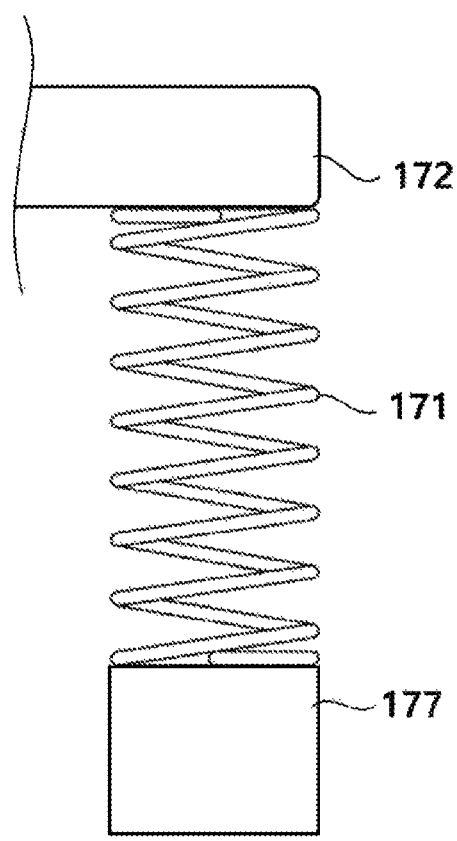

[FIG. 11]
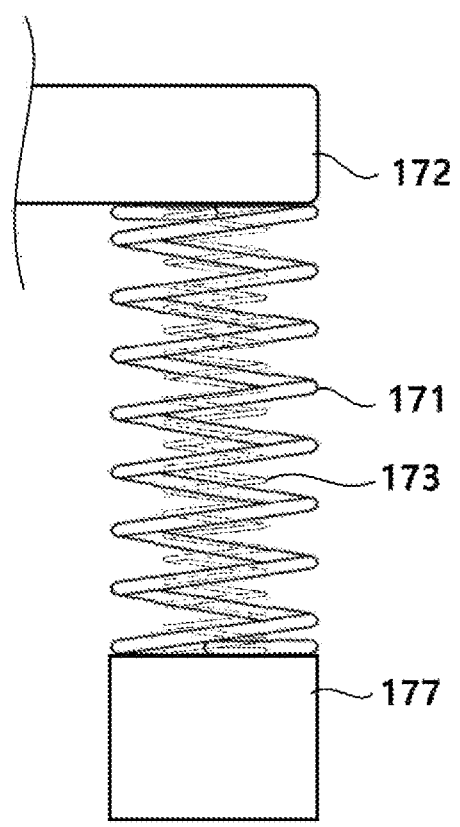

[FIG. 12]
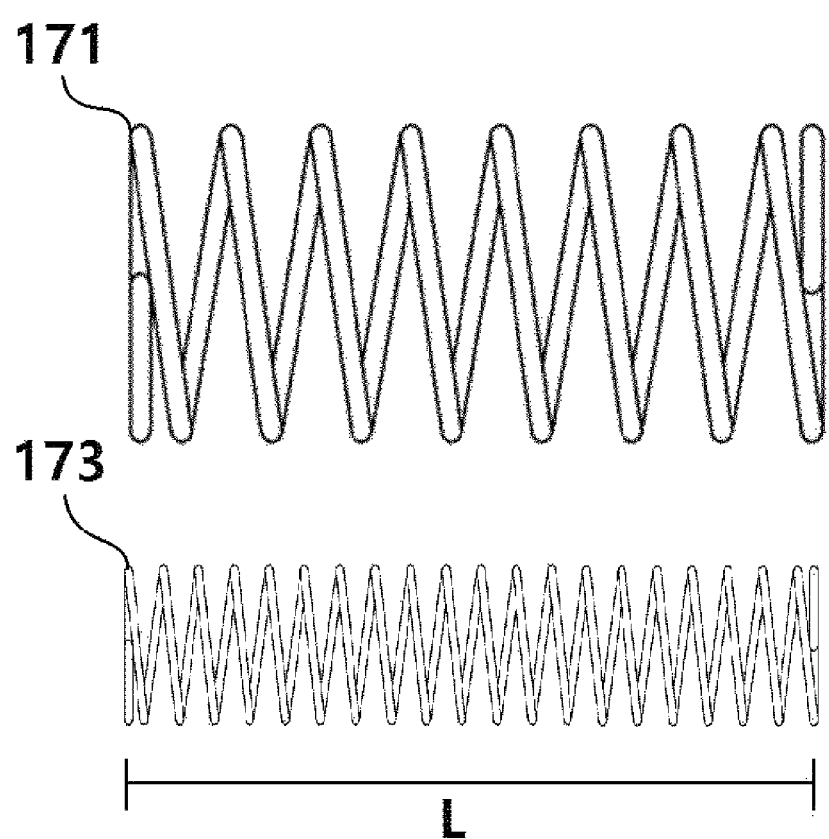

[FIG. 13]
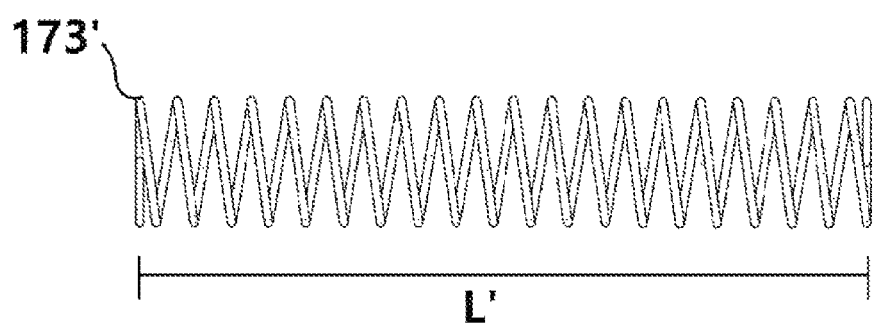

[FIG. 14]
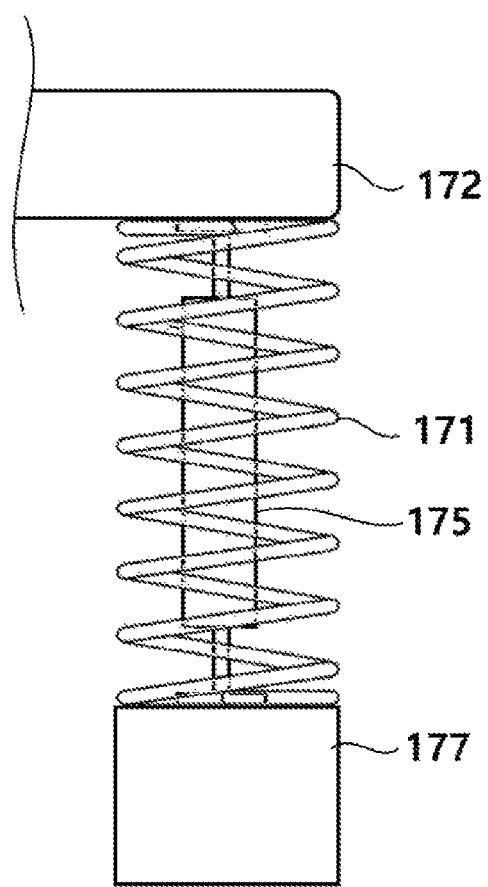

[FIG. 15]
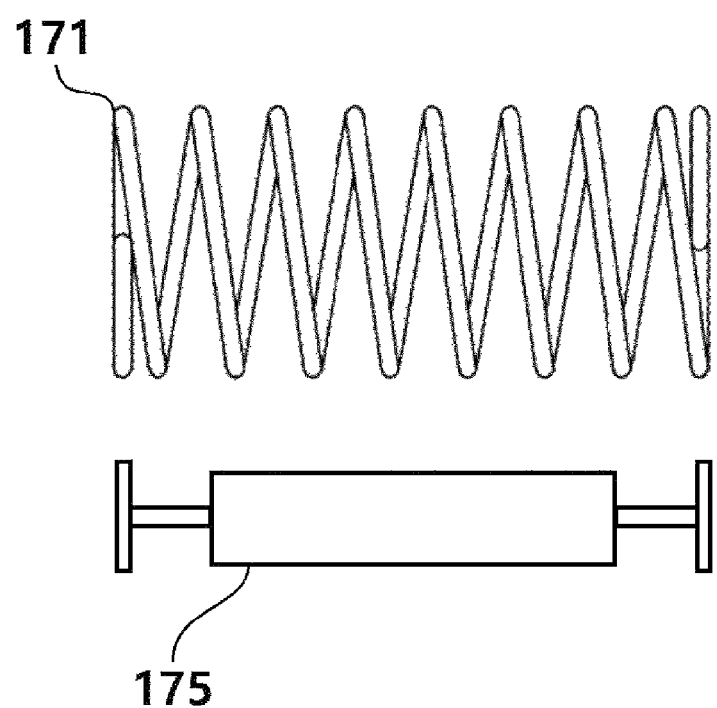

[FIG. 16]
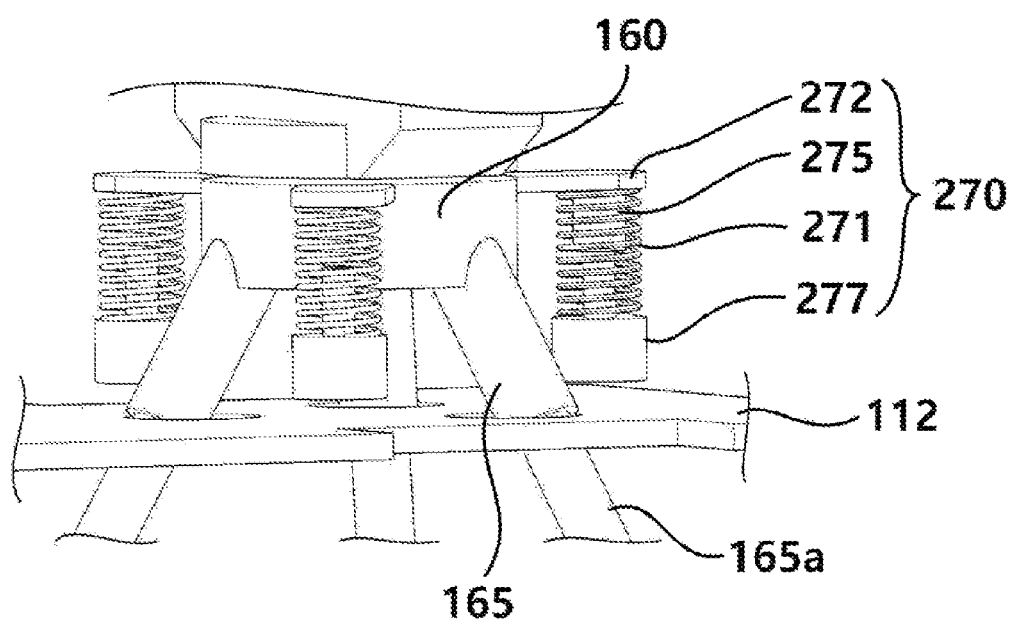

MOBILE ASTRONOMICAL OBSERVATION APPARATUS

TECHNICAL FIELD

The present invention generally relates to a mobile astronomical observation apparatus. More particularly, the present invention relates to a mobile astronomical observation apparatus to which a vibration-resistant structure is applied so as to facilitate making precise observations irrespective of position movement.

BACKGROUND ART

Generally, an astronomical observation apparatus that is used for precise observations is large in weight and volume and is installed at a fixed place such as an observatory to observe so as to increase observation precision. To install the astronomical observation apparatus, a site is selected by research and study in advance, and great effort and large financial investment are required to construct specially a specialized building. However, it is actually impossible to move the apparatus after installation. In addition, for precise observations, it is required to observe a sky in the darkness of night, but when light pollution increases due to urban expansion around a place at which the observation apparatus is installed, observation efficiency decreases.

In addition, as for observation of celestial phenomena and artificial celestial bodies such as satellites, it is occasionally possible to perform observation at only one specific area, depending on the characteristic of the observation, but it is generally required to compare observation values observed at various areas on the surface of the earth.

To this end, a facility for astronomical observation capable of being moved by a vehicle has been developed. However, the conventional mobile astronomical observation facility does not absorb road surface vibration completely and accordingly, the precision of an observation apparatus is lowered in a moving process, whereby after arrival at an observation place, additional work such as correction and maintenance are required. Furthermore, during moving, the highly sensitive observation apparatus may be damaged by impacts.

Furthermore, even during observation, vibration in the facility is amplified and transmitted to components of the observation apparatus such as an astronomical telescope, whereby observation quality is deteriorated.

DISCLOSURE

Technical Problem

The present invention is intended to provide a mobile astronomical observation apparatus to which a vibration-resistant structure is applied so as to facilitate making precise observations irrespective of position movement.

SUMMARY OF THE INVENTION

In order to accomplish the above object, the mobile astronomical observation apparatus may be used by being installed on a cargo box of the vehicle so as to be moved or may be used by being installed on a facility of a trailer type so as to be pulled by the vehicle to be moved.

The mobile astronomical observation apparatus includes transport wheels, a bottom plate, side walls, fixing support parts, an astronomical telescope, a celestial body tracker, a relatively-fixed body, a vibration-resistant member, and a ground-fixing rod. The transport wheels may be arranged on a lower part of the mobile astronomical observation apparatus, and a pair of transport wheels may move by rotating while the mobile astronomical observation apparatus is being moved. The bottom plate may constitute the bottom surface of the mobile astronomical observation apparatus and may be combined with the transport wheels such that the transport wheels may rotate, wherein the bottom plate may be a plate made of a firm solid. The side walls may protrude upward from edges of the bottom plate so as to protect an inner facility and have a receiving space. Each of the fixing support parts may be arranged on a lower part or a side part of the bottom plate, wherein when the mobile astronomical observation apparatus is in the moving mode, each of the fixing support parts may be spaced apart from the ground so as to maintain a state of being attached on the bottom plate, and when the mobile astronomical observation apparatus is in an observation mode, each of the fixing support parts may protrude toward the ground and support the bottom plate of the mobile astronomical observation apparatus over the ground. The astronomical telescope and the celestial body tracker may be arranged in the receiving space, and when the mobile astronomical observation apparatus is in the observation mode, may be exposed to the outside so as to allow a celestial body to be observed. The celestial body tracker may be combined with the astronomical telescope and move the astronomical telescope to a position of the celestial body to be observed so as to track the celestial body.

In an embodiment, the mobile astronomical observation apparatus may be connected to the side walls and may further include observation apparatus protecting covers covering or opening an upper part of the receiving space.

In the embodiment, the relatively-fixed body may be combined on the celestial body tracker. The ground-fixing rod may be combined on the celestial body tracker and when the mobile astronomical observation apparatus is in the moving mode, the ground-fixing pins connected to the ground-fixing rod may be shrunk so as to maintain a state of being spaced apart from the ground. In this case, although weights of the celestial body tracker and the astronomical telescope are transmitted to the bottom plate by the relatively-fixed body and the vibration-resistant member, the vibration-resistant member may connect the relatively-fixed body to the bottom plate and block the vibration and the impact of the bottom plate so as to protect the astronomical telescope arranged on the relatively-fixed body.

In the embodiment, when the mobile astronomical observation apparatus is in the observation mode, a ground-fixing pin may push up the relatively-fixed body combined with the celestial body tracker while the ground-fixing pin is extended toward the ground and fixed to the ground, whereby the relatively-fixed body, the celestial body tracker connected to the relatively-fixed body, and the astronomical telescope connected to the celestial body tracker may move away from the bottom plate so as to be spaced apart therefrom.

In the embodiment, an end of the vibration-resistant member may be spaced apart from the bottom plate or the relatively-fixed body.

In the embodiment, opposite ends of the vibration-resistant member may maintain states of being connected to the bottom plate and the relatively-fixed body.

In the embodiment, when the mobile astronomical observation apparatus is used in a type of a trailer, a connection member may be attachably/detachably combined with the vehicle and may include: the movement-support part supporting the mobile astronomical observation apparatus such that the front part of the astronomical observation apparatus 100 has a predetermined height; the connecting end attachably/detachably combined on the vehicle; and the connecting rods protruding from the front part of the mobile astronomical observation apparatus and being connected to the movement-support part and the connecting end.

In the embodiment, when the mobile astronomical observation apparatus is in the moving mode, the observation apparatus protecting covers may be covered so as to protect the astronomical telescope arranged in the receiving space; the fixing support part may be spaced apart from the ground so as to be received toward the bottom plate; and the ground-fixing rod may be spaced apart from the ground, whereby weights of celestial body tracker including the astronomical telescope may be transmitted through the relatively-fixed body to the vibration-resistant member so as to absorb vibrations. The fixing support part may be spaced apart from the ground so as to be received toward the bottom plate, and the ground-fixing rod may be spaced apart from the ground and thus the relatively-fixed body may not be supported.

In the embodiment, when the mobile astronomical observation apparatus is in the observation mode, the observation apparatus protecting covers may be opened; the astronomical telescope arranged in the receiving space may be exposed to the outside; the fixing support part may be fixed to the ground so as to support the bottom plate; and the ground-fixing rod may be fixed to the ground so as to release or partially release combination of the vibration-resistant member connected to the relatively-fixed body and the bottom plate, whereby vibration transmitted from the bottom plate may be controlled.

In the embodiment, the celestial body tracker may support the astronomical telescope and may use a celestial body tracking method of an altazimuth mount or a celestial body tracking method of an equatorial mount allowing the astronomical telescope to investigate and track a celestial body.

DESCRIPTION OF DRAWINGS

FIG. 1 is a cross-sectional view showing a mobile astronomical observation apparatus according to an embodiment of the present invention.

FIG. 2 is a perspective view showing front parts of the astronomical observation apparatus and a connection member when the astronomical observation apparatus shown in FIG. 1 is in a moving mode.

FIG. 3 is a perspective view showing a rear part of the astronomical observation apparatus when the astronomical observation apparatus shown in FIG. 1 is in the moving mode.

FIG. 4 is a perspective view showing an astronomical telescope and a vibration-resistant member of the astronomical observation apparatus shown in FIG. 2.

FIG. 5 is a side view showing the astronomical telescope and the vibration-resistant member of the astronomical observation apparatus shown in FIG. 2.

FIG. 6 is a perspective view showing the front parts of the astronomical observation apparatus and the connection member when the astronomical observation apparatus shown in FIG. 1 is in an observation mode.

FIG. 7 is a perspective view showing the rear part of the astronomical observation apparatus when the astronomical observation apparatus shown in FIG. 1 is in the observation mode.

FIG. 8 is a perspective view showing the astronomical telescope and the vibration-resistant member of the astronomical observation apparatus shown in FIG. 6.

FIG. 9 is a side view showing the astronomical telescope and the vibration-resistant member of the astronomical observation apparatus shown in FIG. 6.

FIG. 10 is a side view showing a main spring of the vibration-resistant member shown in FIG. 6.

FIG. 11 is a side view showing a vibration-resistant member according to an embodiment of the present invention.

FIG. 12 is a side view showing an exploded state of the vibration-resistant member shown in FIG. 11.

FIG. 13 is a side view showing an extended state of an auxiliary spring shown in FIG. 12.

FIG. 14 is a side view showing a vibration-resistant member according to an embodiment of the present invention.

FIG. 15 is a side view showing an exploded state of the vibration-resistant member shown in FIG. 14.

FIG. 16 is a perspective view showing a vibration-resistant member when the mobile astronomical observation apparatus according to an embodiment of the present invention is in an observation mode.

MODE FOR INVENTION

Hereinbelow, exemplary embodiments of the present invention will be described in detail with reference to the accompanying drawings. Throughout the drawings, the same reference numerals will refer to the same or like parts. Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to the embodiments of the present invention, a specific example of which is illustrated in the accompanying drawings and described below, since the embodiments of the present invention can be variously modified in many different forms. While the present invention will be described in conjunction with the exemplary embodiments thereof, it is to be understood that the present description is not intended to limit the present invention to the exemplary embodiments. On the contrary, the present invention is intended to cover not only the exemplary embodiments, but also various alternatives, modifications, equivalents and other embodiments that may be included within the spirit and scope of the present invention as defined by the appended claims. In describing the drawings, similar reference numerals are used for shared components.

It will be understood that, although the terms first, second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing particular embodiments only and is not intended to be limiting of example embodiments of the invention. As used herein, the singular forms "a", "an", and "the" are intended to include the plural forms as well, unless the context clearly indicates otherwise. As used herein, the terms "and/or" and "at least one of" include any and all combinations of one or more of the associated listed items. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Hereinbelow, the exemplary embodiments of the present invention will be described in detail with reference to the accompanying drawings. Throughout the drawings, the same reference numerals will refer to the same or like parts, and overlapping descriptions of the same parts will be omitted.

FIG. 1 is a cross-sectional view showing a mobile astronomical observation apparatus according to an embodiment of the present invention.

Referring to FIG. 1, the mobile astronomical observation apparatus includes a vehicle 10, a mobile astronomical observation apparatus 100, and a connection member 50.

The vehicle 10 may be all kinds of mobile vehicles such as an automobile, a motor, a two-wheeled vehicle, a bicycle, and a rickshaw, etc.

The connection member 50 is arranged between the vehicle 10 and the mobile astronomical observation apparatus 100. The connection member 50 transmits power of the vehicle 10 to the mobile astronomical observation apparatus 100, and the vehicle may be combined with or separated from the mobile astronomical observation apparatus.

In FIG. 1, there is shown the mobile astronomical observation apparatus 100, which is connected to the vehicle 10 and pulled by the connection member 50. However, this is an example, and other than a method in which the mobile astronomical observation apparatus 100 is connected to and pulled by the vehicle 10, a method in which the mobile astronomical observation apparatus 100 directly constitutes a part of the vehicle by being provided integrally with a cargo box of the vehicle is also included in the claims of the present invention.

FIG. 2 is a perspective view showing front parts of the astronomical observation apparatus and the connection member when the astronomical observation apparatus shown in FIG. 1 is in a moving mode, and FIG. 3 is a perspective view showing a rear part of the astronomical observation apparatus when the astronomical observation apparatus shown in FIG. 1 is in the moving mode.

Referring to FIGS. 1 to 3, the connection member 50 includes a movement-support part 51, a connecting end 55, and connecting rods 57.

The movement-support part 51 supports the mobile astronomical observation apparatus 100 such that the front part of the astronomical observation apparatus 100 has a predetermined height in the moving mode or in an observation mode of the astronomical observation apparatus 100. In the embodiment, the movement-support part 51 prevents the front part of the mobile astronomical observation apparatus 100 from being tilted by the weight thereof.

The connecting end 55 is combined on the vehicle 10 so as to be attached to/detached from the vehicle 10. For example, the connecting end 55 may be a hook.

The connecting rods 57 protrude from the front part of the mobile astronomical observation apparatus 100 and are connected to the movement-support part 51 and the connecting end 55. For example, two connecting rods 57 protrude from the front part of the mobile astronomical observation apparatus 100 so as to have a shape of an isosceles triangle, and the movement-support part 51 and the connecting end 55 may be connected to a vertex part of the shape of an isosceles triangle.

In another embodiment, the connection member 50 may be a hook, a wire, and all similar shapes of connection members similar to the hook and wire which can transmit power of the vehicle 10 to the mobile astronomical observation apparatus 100.

FIG. 4 is a perspective view showing an astronomical telescope and a vibration-resistant member of the astronomical observation apparatus shown in FIG. 2, and FIG. 5 is a side view showing the astronomical telescope and the vibration-resistant member of the astronomical observation apparatus shown in FIG. 2.

Referring to FIGS. 1 to 5, the mobile astronomical observation apparatus 100 includes transport wheels 105, a bottom plate 112, side walls 114, observation apparatus protecting covers 120, fixing support parts 125, the astronomical telescope 130, a celestial body tracker 145, a relatively-fixed body 160, ground-fixing rods 165, and the vibration-resistant member 170.

The transport wheels 105 are arranged on a lower part of the mobile astronomical observation apparatus 100 and rotate during movement of the mobile astronomical observation apparatus 100 so as to move the astronomical observation apparatus 100. In the embodiment, a pair of transport wheels 105 allows the astronomical observation apparatus to move in an even height along the ground (5 of FIG. 9) during the movement of the astronomical observation apparatus 100. For example, the transport wheels 105 include a rubber tire, to which pneumatic pressure is applied, and a suspension, thereby protecting the mobile astronomical observation apparatus 100 from external impacts and allowing the mobile astronomical observation apparatus to move efficiently. In the embodiment, the mobile astronomical observation apparatus 100 does not include an additional engine for driving, and accordingly, the transport wheels 105 are rotated by inertia occurring due to power provided through the connection member 50 from the vehicle 10. In another embodiment, the mobile astronomical observation apparatus 100 is provided integrally with the cargo box of the vehicle 10, and the transport wheels 105 may be rear wheels of the vehicle 10.

The bottom plate 112 constitutes a bottom surface of the astronomical observation apparatus 100, is combined with the transport wheels 105 such that the transport wheels are rotatable, and supports the astronomical telescope 130. For example, the bottom plate 112 may be a plate made of a firm solid such as an iron plate, a plastic plate, and a wooden plate. In another embodiment, the bottom plate 112 may be a plurality of rod-shaped supporting parts (not shown) and a plurality of support plates (not shown) arranged between the supporting parts (not shown).

The bottom plate 112 constitutes the bottom surface of the astronomical observation apparatus 100, is combined with the transport wheels 105 such that the transport wheels are rotatable, and supports the astronomical telescope 130. For example, the bottom plate 112 may be a plate made of a firm solid such as an iron plate, a plastic plate, and a wooden plate. In another embodiment, the bottom plate 112 may be the plurality of rod-shaped supporting parts (not shown) and a plurality of the support plates (not shown) arranged between the supporting parts (not shown).

The side walls 114 protrude upward from edges of the bottom plate 112 so as to have a receiving space receiving the astronomical telescope 130. In the embodiment, a plurality of side walls 114 may protrude from four edges of the bottom plate 112 having a quadrangular shape.

Each of the observation apparatus protecting covers 120 is combined with the side walls 114 so as to cover an upper part of the receiving space and to cover or expose the astronomical telescope 130 to the outside by being opened along one side of each of the side walls 114. In the embodiment, a pair of observation apparatus protecting covers 120 may be arranged to face each other so as to cover or expose the astronomical telescope 130 to the outside.

For example, when the mobile astronomical observation apparatus 100 is in the moving mode, the observation apparatus protecting covers 120 are combined with each other so as to face each other and cover the astronomical telescope 130 such that the astronomical telescope is not exposed to the outside. On the contrary, when the mobile astronomical observation apparatus 100 is in the observation mode, the observation apparatus protecting covers 120 are opened so as to expose the astronomical telescope 130 to the outside.

In another embodiment, the astronomical telescope 130 and the celestial body tracker 145 themselves may include water-proof functions, and accordingly, the observation apparatus protecting covers 120 as covers opening/covering in a form of a shelter may be attached to a body of the celestial body tracker 145. When the observation apparatus protecting covers 120 as the covers opening/covering in the form of a shelter are attached to the body of the celestial body tracker 145, additional observation apparatus protecting covers 120 provided on the outside thereof may be omitted.

The fixing support parts 125 are arranged on a lower part of the bottom plate 112. When the mobile astronomical observation apparatus 100 is in the moving mode, the fixing support parts 125 are spaced apart from the ground (5 of FIG. 9) and maintain states of being attached to the bottom plate 112. On the contrary, when the mobile astronomical observation apparatus 100 is in the observation mode, the fixing support parts 125 protrude toward the ground (5 of FIG. 9) and support the bottom plate 112 of the mobile astronomical observation apparatus 100 over the ground (5 of FIG. 9).

The astronomical telescope 130 is arranged in the receiving space defined by the bottom plate 112 and the side walls 114 and is exposed to the outside when the mobile astronomical observation apparatus 100 is in the observation mode so as to observe a celestial body. For example, the astronomical telescope 130 may be an apparatus such as a radio telescope observing visible rays, infrared rays, ultraviolet rays, and radiation, etc. caused or reflected by objects located outside of earth's atmosphere.

The celestial body tracker 145 controls the astronomical telescope 130 so as to specifically decide a direction and an observation object of the astronomical telescope 130. For example, the celestial body tracker 145 may be used so as to correct parallax motion of a celestial body observed by the astronomical telescope 130. Accordingly, although quantity of light of a celestial body is small, the celestial body tracker corrects the parallax motion and allows the astronomical telescope to be exposed to the same celestial body for a long time. Furthermore, the celestial body tracker 145 may observe and track an artificial celestial body (not shown) such as satellites orbiting various earth orbits. When one object is observed at the same time while a plurality of astronomical observation apparatuses according to the embodiment of the present invention are spaced farther apart from each other, parallax between a celestial body as a background and an artificial celestial body may be analyzed so as to analyze the altitude and orbit of the artificial celestial body.

In the embodiment, the celestial body tracker 145 includes a vertical movement part 140 and a horizontal movement part 150. In another embodiment, celestial body trackers of various configurations may be used as far as the celestial body trackers can specifically determine a direction of an observation object of the astronomical telescope 130. The celestial body tracker 145 supports the astronomical telescope 130, and the astronomical telescope 130 may use a celestial body tracking method of an altazimuth mount or a celestial body tracking method of an equatorial mount, which allows a celestial body to be investigated and tracked, and a method of combining the two methods properly, which allows an artificial celestial body to be easily tracked.

The vertical movement part 140 supports the astronomical telescope 130 and moves the astronomical telescope 130 in a vertical direction. In the embodiment, the vertical movement part 140 fixes a part of each of opposite sides of the astronomical telescope 130 and rotates the astronomical telescope 130 in the vertical direction by using the fixed part as an axis. For example, the vertical movement part 140 may include two extending parts fixing the opposite sides of the astronomical telescope 130 and a verticality control part (not shown) combined on each of the extending parts so as to control a rotation amount of the astronomical telescope 130.

The horizontal movement part 150 is connected to a lower part of the vertical movement part 140 and rotates the astronomical telescope 130 in a horizontal direction. In the embodiment, the horizontal movement part 150 is combined on the lower part of the vertical movement part 140 and rotates the astronomical telescope 130 and the vertical movement part 140 in the horizontal direction by using the combined part as an axis. For example, the horizontal movement part 150 is combined on the lower part of the vertical movement part 140 and may include a horizontality control part (not shown) controlling rotation amounts of the astronomical telescope 130 and the vertical movement part 140.

The relatively-fixed body 160 is rotatably combined with the horizontal movement part 150 arranged on an upper part thereof, and is combined with the ground-fixing rods 165 and the vibration-resistant member 170 provided on a lower part of the relatively-fixed body. In the embodiment, the relatively-fixed body 160 is relatively fixed by the vertical movement part 140 and the horizontal movement part 150 relative to the astronomical telescope 130, but is not fixed relative to the bottom plate 112.

The ground-fixing rods 165 are connected integrally to the lower part of the relatively-fixed body 160 and, when the mobile astronomical observation apparatus 100 is in the moving mode, are spaced apart from the ground (5 of FIG. 9) so as to move along with motion of the relatively-fixed body 160. On the contrary, when the mobile astronomical observation apparatus 100 is in the observation mode, the ground-fixing rods 165 are fixed to the ground (5 of FIG. 9) and support the relatively-fixed body 160 connected integrally to the ground-fixing rods over the ground (5 of FIG. 9).

The vibration-resistant member 170 supports the relatively-fixed body 160 over the bottom plate 112, and protects the relatively-fixed body 160 by blocking vibration or impact of the bottom plate 112. A first end of the vibration-resistant member 170 may be connected on any one of the relatively-fixed body 160 and the bottom plate 112, and a second end of the vibration-resistant member may be detachably placed on the remaining one of the relatively-fixed body 160 and the bottom plate 112. For example, an upper part of the vibration-resistant member 170 may be connected to the relatively-fixed body 160, and a lower part of the vibration-resistant member 170 may be arranged in a state of substantially floating over the bottom plate 112 (the observation mode) and in a state of being pushed by the weight thereof (the moving mode). In another embodiment, while the lower part of the vibration-resistant member 170 is connected to the bottom plate 112, the upper part of the vibration-resistant member 170 may be arranged in a state of being spaced apart from the relatively-fixed body 160 (the observation mode) and in a state of being pushed by the weight thereof (the moving mode). In still another embodiment, the upper part and the lower part of the vibration-resistant member 170 may maintain a state of being connected to the relatively-fixed body 160 and the bottom plate 112, respectively.

When vibration or impact is applied to the astronomical telescope 130, the precision of the astronomical telescope 130 is deteriorated or damaged, whereby an additional correction or repair is required. However, in the embodiment, when the mobile astronomical observation apparatus 100 is in the moving mode, the vibration-resistant member 170 isolates the bottom plate 112 and the relatively-fixed body 160 from vibration or impact, thereby protecting the astronomical telescope 130 during the movement.

FIG. 6 is a perspective view showing the front parts of the astronomical observation apparatus and the connection member when the astronomical observation apparatus shown in FIG. 1 is in the observation mode; FIG. 7 is a perspective view showing the rear part of the astronomical observation apparatus when the astronomical observation apparatus shown in FIG. 1 is in the observation mode; FIG. 8 is a perspective view showing the astronomical telescope and the vibration-resistant member of the astronomical observation apparatus shown in FIG. 6; and FIG. 9 is a side view showing the astronomical telescope and the vibration-resistant member of the astronomical observation apparatus shown in FIG. 6.

Referring to FIGS. 1 and 2, and FIGS. 6 to 9, when the mobile astronomical observation apparatus 100 is in the observation mode, the observation apparatus protecting covers 120 are opened outward so as to expose the astronomical telescope 130, the celestial body tracker 145, and the vibration-resistant member 170 to the outside.

Ground-fixing pins 165a protrude from lower parts of the ground-fixing rods 165 so as to be fixed to the ground 5. For example, three ground-fixing rods 165 protrude from the lower part of the relatively-fixed body 160, and each of the ground-fixing pins 165a protrudes from a lower part of each of the ground-fixing rods 165 so as to have a tripod shape and may be fixed to the ground 5.

The ground-fixing pins 165a protrude from inner parts of the ground-fixing rods 165 toward the ground 5 so as to be fixed to the ground 5. In the embodiment, while the ground-fixing pins 165a are fixed to the ground 5, the ground-fixing pins push up the relatively-fixed body 160 combined on the celestial body tracker 145 such that the relatively-fixed body moves away from the bottom plate 112. As the relatively-fixed body 160 moves away from the bottom plate 112, the celestial body tracker 145 connected to the relatively-fixed body 160 and the astronomical telescope 130 connected to the celestial body tracker 145 also move away from the bottom plate 112.

The vibration-resistant member 170 is arranged between the relatively-fixed body 160 and the bottom plate 112, and the first end of the vibration-resistant member is spaced apart from the relatively-fixed body 160 or from the bottom plate 112, whereby the astronomical telescope 130 is protected from vibration or impact of the bottom plate 112. When the first end of the vibration-resistant member 170 is spaced apart from the relatively-fixed body 160 or the bottom plate 112, the relatively-fixed body 160 and the bottom plate 112 maintain a state of being physically separated from each other. Particularly, the relatively-fixed body 160 is supported over the ground 5 by the ground-fixing rods 165 and the ground-fixing pins 165a, and while the bottom plate 112 is physically separated from the relatively-fixed body 160, the bottom plate 112 is arranged over the ground 5 by the fixing support parts 125 and/or the transport wheels 105.

In the embodiment, "a physically separated state" of the first end of the vibration-resistant member 170 from the relatively-fixed body 160 or the bottom plate 112 refers to "a floating state" in which the vibration-resistant member 170 is extended by weight thereof and is not influenced by weights of outside components or a state in which the first end of the vibration-resistant member is completely spaced apart from the relatively-fixed body or the bottom plate. In the embodiment, the state in which the bottom plate 112 is physically separated from the relatively-fixed body 160 may be a state in which the first end of the vibration-resistant member 170 is physically and completely spaced apart from the relatively-fixed body 160 or from the bottom plate 112 so as to be separated therefrom.

In addition, "the physically separated state" includes "a physically separated state" from vibration or impact of the bottom plate 112 by maintaining a state in which elasticity is substantially relaxed although opposite ends of the vibration-resistant member 170 are connected to the relatively-fixed body 160 and the bottom plate 112. In another embodiment, when the elasticity of the vibration-resistant member 170 is in a substantially relaxed state in a process in which the relatively-fixed body 160 is pushed up by the ground-fixing rods 165 and the ground-fixing pins 165a even when the opposite ends of the vibration-resistant member 170 are connected to the bottom plate 112 and the relatively-fixed body 160, only weights of the relatively-fixed body 160, the celestial body tracker 145, and the astronomical telescope 130 are applied to the ground-fixing rods 165 and the ground-fixing pins 165a, and weights of the bottom plate 112, the side walls 114, and the observation apparatus protecting covers 120 are applied only to the fixing support parts 125 and/or the transport wheels 105, but may not be applied to the ground-fixing rods 165 and the ground-fixing pins 165a.

For example, even when vibration or impact is applied to the side walls 114 or the bottom plate 112 by wind, the touching or foot movement of an observer (not shown) during observation, the astronomical telescope 130 is protected from the vibration or impact.

FIG. 10 is a side view showing a main spring of the vibration-resistant member shown in FIG. 6.

Referring to FIGS. 1 to 10, the vibration-resistant member 170 includes an upper plate 172, the main spring 171, and a floater 177.

The main spring 171 is connected on the upper plate 172 and the floater 177, and is arranged therebetween. The upper plate 172 is connected with the relatively-fixed body 160. For example, the upper plate 172 may be connected on an outer surface of the relatively-fixed body 160.

The floater 177 is connected on a lower part of the main spring 171, and when the mobile astronomical observation apparatus 100 is in the observation mode, maintains a state of being physically separated from the bottom plate 112, whereby vibration or impact of the bottom plate 112 is not transmitted to the relatively-fixed body 160. For example, a partially extended state of the main spring 171 is maintained by a weight of the floater 177, and the floater 177 may be in a state substantially floating over the bottom plate 112.

In the embodiment, a plurality of vibration-resistant members 170 are arranged between the relatively-fixed body 160 and the bottom plate 112 so as to protect the astronomical telescope 130 from vibration or impact.

When the mobile astronomical observation apparatus 100 is in the moving mode, the astronomical telescope 130, the celestial body tracker 145, the relatively-fixed body 160, the ground-fixing rods 165, and the ground-fixing pins 165a are supported over the bottom plate 112 by the vibration-resistant member 170. The main spring 171 of the vibration-resistant member 170 is in a state of being compressed by weights of the astronomical telescope 130, the celestial body tracker 145, the relatively-fixed body 160, the ground-fixing rods 165, and the ground-fixing pins 165a, and the floater 177 is pressed on the bottom plate 112 by the compression of the main spring 171 so as to be in close contact with the bottom plate.

The vibration-resistant member 170 isolates astronomical telescope 130 from vibration or impact occurring during the movement so as to protect the astronomical telescope 130 during the movement. Furthermore, when the mobile astronomical observation apparatus 100 is in the observation mode, the vibration-resistant member 170 protects the astronomical telescope 130 during observation by isolating vibration or impact caused by an observer (not shown).

FIG. 11 is a side view showing a vibration-resistant member according to an embodiment of the present invention, FIG. 12 is a side view showing an exploded state of the vibration-resistant member shown in FIG. 11, and FIG. 13 is a side view showing an extended state of an auxiliary spring shown in FIG. 12. In the embodiment, the remaining components other than the vibration-resistant member are the same as the components of the embodiment shown in FIGS. 1 to 10 and accordingly, overlapped description about the same components will be omitted.

Referring to FIGS. 1 to 9 and FIGS. 11 to 13, the vibration-resistant member includes the upper plate 172, the main spring 171, the auxiliary spring 173, and the floater 177.

The main spring 171 is arranged between the upper plate 172 and the floater 177, the upper plate 172 is fixed to the relatively-fixed body 160, and the floater 177 is placed on the bottom plate 112, whereby the astronomical telescope 130 is primarily protected from vibration or impact.

The auxiliary spring 173 is arranged in a state of being compressed on the inner part of the main spring 171 and accordingly, secondarily protects the astronomical telescope 130 from vibration or impact. When the auxiliary spring 173' is combined on the main spring 171, an initial length L' of the auxiliary spring decreases and becomes the same length L as length of the main spring 171. Since the auxiliary spring 173 is compressed as the length of the auxiliary spring decreases, the vibration-resistant member stores a predetermined elasticity. The elasticity stored in the vibration-resistant member by the auxiliary spring 173 allows external vibration or impact, particularly, minute vibration or minute impact to be effectively blocked.

Thickness and diameter of the auxiliary spring 173 are smaller than thickness and diameter of the main spring 171. The auxiliary spring 173 has the thickness and diameter different from the main spring 171, and accordingly, vibration blocked by the main spring 171 and vibration blocked by the auxiliary spring 173 are different in amplitude and size from each other.

In the embodiment, the vibration-resistant member includes a composite spring having the main spring 171 and the auxiliary spring 173 combined with each other, which have thicknesses and diameters different from each other, thereby effectively protecting the astronomical telescope 130 from vibrations having various amplitude and sizes. Particularly, a shock wave produced by external impacts has an aspect that vibrations of various wavelengths are complexly combined with each other, and accordingly, when the vibration-resistant member has different thicknesses and diameters, impact resistance of the vibration-resistant member is considerably improved.

FIG. 14 is a side view showing a vibration-resistant member according to an embodiment of the present invention, and FIG. 15 is a side view showing an exploded state of the vibration-resistant member shown in FIG. 14. In the embodiment, the remaining components other than the vibration-resistant member are the same as the components of the embodiment shown in FIGS. 1 to 10 and accordingly, overlapping description of the same components will be omitted.

Referring to FIGS. 1 to 9, and FIGS. 14 and 15, the vibration-resistant member includes the upper plate 172, the main spring 171, the damper 175, and the floater 177.

The main spring 171 is arranged between the upper plate 172 and the floater 177, the upper plate 172 is connected to the relatively-fixed body 160, and the floater 177 is arranged in a state of being placed on the bottom plate 112, whereby the astronomical telescope 130 is primarily protected from vibration or impact.

The damper 175 is combined with the main spring 171 and absorbs vibration or impact transmitted from the bottom plate 112 so as to secondarily protect the astronomical telescope 130. For example, the damper 175 may be arranged on an inner part of the main spring 171. In another embodiment, the damper 175 may be arranged on an outer part of the main spring 171. For example, the damper 175 may be a shock absorber.

In the embodiment, the damper 175 may be a hydraulic cylinder. The main spring 171 functions to isolate the astronomical telescope 130 from vibration and impact by blocking the vibration and the impact, and the damper 175 absorbs vibration and impact applied to the vibration-resistant member and accordingly, although the vibration and impact are transmitted to the astronomical telescope 130, the vibration and impact are immediately canceled out.

FIG. 16 is a perspective view showing a vibration-resistant member when the mobile astronomical observation apparatus according to an embodiment of the present invention is in an observation mode. In the embodiment, the remaining components other than the vibration-resistant member are the same as the components of the embodiment shown in FIGS. 1 to 10 and accordingly, the overlapped description about the same components will be omitted.

Referring to FIGS. 1 to 9, and FIGS. 15 and 16, the vibration-resistant member 270 includes an upper plate 272, a main spring 271, a damper 275, and a floater 277.

The floater 277 is connected on lower parts of the main spring 271 and the damper 275 and, when the mobile astronomical observation apparatus 100 is in the observation mode, is spaced apart from the bottom plate 112 so as to maintain a state physically separated therefrom, whereby vibration or impact of the bottom plate 112 is not transmitted to the relatively-fixed body 160. In the embodiment, a completely extended state of the main spring 271 is maintained by a weight of the floater 277, and the floater 277 is over the bottom plate 112 so as to be completely spaced apart therefrom.

According to the embodiments of the present invention, the movement of the astronomical observation apparatus is possible and accordingly, astronomical observation may be performed at various places.

In addition, vibration and impact occurring during the movement of the astronomical observation apparatus are prevented from being transmitted to the mobile astronomical observation apparatus, whereby precision of the astronomical telescope is prevented from being lowered or damaged by the vibration or impact during the movement. That is, when the mobile astronomical observation apparatus is in the moving mode, the vibration-resistant member isolates the bottom plate and the relatively-fixed body from vibration or impact and accordingly protects the astronomical telescope during the movement. Accordingly, an additional correction or repair is not required after arrival at an observatory, whereby observation time is saved and repair cost is decreased.

In addition, vibration caused by an observer during celestial body observation is prevented from being transmitted to the astronomical telescope. For example, when an observer climbs on the bottom plate so as to use the astronomical telescope, vibration or impact is transmitted to the bottom plate. The vibration-resistant member isolates the bottom plate and the relatively-fixed body from the vibration or the impact so as to protect the astronomical telescope therefrom. Accordingly, the precision of the astronomical telescope is improved.

Furthermore, the vibration-resistant member includes a composite spring having the main spring and the auxiliary spring combined with each other, which have thicknesses and diameters different from each other, thereby effectively protecting the astronomical telescope from vibrations having various amplitudes and sizes. Particularly, a shock wave produced by external impacts has an aspect that vibrations of various wavelengths are complexly combined with each other, and accordingly, when the vibration-resistant member has different thicknesses and diameters, impact resistance of the vibration-resistant member is considerably improved.

Additionally, since the vibration-resistant member has a composite structure of having the spring and the damper combined with each other, the vibration-resistant member blocks vibration and impact and efficiently absorbs minute vibration and impact transmitted to the relatively-fixed body so as to protect the astronomical telescope.

The invention claimed is:

1. A mobile astronomical observation apparatus connected to a vehicle by a connection member, the apparatus comprising:
a bottom plate constituting a bottom surface of the mobile astronomical observation apparatus and being a plate made of a firm solid; side walls provided by protruding upward from edges of the bottom plate so as to have a receiving space; fixing support parts arranged on a lower part of the bottom plate, each of the fixing support parts maintaining a state of being spaced apart from ground and attached to the bottom plate as the mobile astronomical observation apparatus is in a moving mode and supporting the bottom plate of the mobile astronomical observation apparatus over the ground by protruding toward the ground as the mobile astronomical observation apparatus is in an observation mode; an astronomical telescope arranged in the receiving space, the astronomical telescope being exposed to an outside as the mobile astronomical observation apparatus is in the observation mode; a celestial body tracker being formed of a vertical movement part and a horizontal movement part, the vertical movement part movably combined with the horizontal movement part, the astronomical telescope movably combined with the vertical movement part so as to move the astronomical telescope according to an observation position; a round-shaped body supporting the horizontal movement part; ground-fixing rods combined with the round-shaped body, each of the ground-fixing rods maintaining a state of being spaced apart from the ground as the mobile astronomical observation apparatus is in the moving mode and supporting the round-shaped body over the ground by being fixed to the ground as the mobile astronomical observation apparatus is in the observation mode; and a vibration-resistant member connecting the round-shaped body to the bottom plate and blocking vibration or impact of the bottom plate so as to protect the astronomical telescope arranged on the round-shaped body.

2. The apparatus of claim 1, further comprising:
observation apparatus protecting covers combined with the side walls so as to cover an upper part of the receiving space.

3. The apparatus of claim 1, wherein as the mobile astronomical observation apparatus is in the moving mode, a ground-fixing pin connected to each of the ground-fixing rods is received to an inner part of each of the ground-fixing rods so as to maintain a state of being spaced apart from the ground; weights of the celestial body tracker and the astronomical telescope are transmitted through the round-shaped body and the vibration-resistant member to the bottom plate; and the vibration-resistant member connects the round-shaped body to the bottom plate and blocks the vibration and the impact of the bottom plate so as to protect the astronomical telescope arranged on the round-shaped body.

4. The apparatus of claim 1, wherein as the mobile astronomical observation apparatus is in the observation mode, a ground-fixing pin connected to each of the ground-fixing rods pushes up the round-shaped body combined with the celestial body tracker while the ground-fixing pin is fixed to the ground by protruding toward the ground, whereby the round-shaped body, the celestial body tracker connected to the round-shaped body, and the astronomical telescope connected to the celestial body tracker are spaced apart from the bottom plate.

5. The apparatus of claim 4, wherein an end of the vibration-resistant member is spaced apart from the bottom plate or the round-shaped body.

6. The apparatus of claim 4, wherein opposite ends of the vibration-resistant member maintain states of being connected to the bottom plate and the round-shaped body.

\* \* \* \* \*